US012206163B2

(12) United States Patent
Jiang et al.

(10) Patent No.: US 12,206,163 B2
(45) **Date of Patent: *Jan. 21, 2025**

(54) ELECTRONIC DEVICES HAVING ANTENNAS THAT RADIATE THROUGH THREE-DIMENSIONALLY CURVED COVER LAYERS

(71) Applicant: Apple Inc., Cupertino, CA (US)

(72) Inventors: Yi Jiang, Cupertino, CA (US); Jiangfeng Wu, San Jose, CA (US); Lijun Zhang, Los Gatos, CA (US); Siwen Yong, San Francisco, CA (US); Mattia Pascolini, San Francisco, CA (US); Samuel A. Resnick, San Francisco, CA (US); Anthony S. Montevirgen, Redwood City, CA (US)

(73) Assignee: Apple Inc., Cupertino, CA (US)

(*) Notice: Subject to any disclaimer, the term of this patent is extended or adjusted under 35 U.S.C. 154(b) by 14 days.

This patent is subject to a terminal disclaimer.

(21) Appl. No.: 17/865,241

(22) Filed: Jul. 14, 2022

(65) Prior Publication Data

US 2022/0384941 A1 Dec. 1, 2022

Related U.S. Application Data

(63) Continuation of application No. 17/008,862, filed on Sep. 1, 2020, now Pat. No. 11,417,951.

(51) Int. Cl.
*H01Q 1/38* (2006.01)
*H01Q 1/24* (2006.01)
(Continued)

(52) U.S. Cl.
CPC ............... *H01Q 1/422* (2013.01); *H01Q 1/24* (2013.01); *H01Q 1/38* (2013.01); *H01Q 1/2291* (2013.01)

(58) Field of Classification Search
None
See application file for complete search history.

(56) References Cited

U.S. PATENT DOCUMENTS 4,495,503 A 1/1985 Morman
5,929,825 A 7/1999 Niu et al.
(Continued)

FOREIGN PATENT DOCUMENTS

CA 2399383 C 7/2010
CN 103947039 A 7/2014
(Continued)

OTHER PUBLICATIONS

"Dielectric Constant", captured by Wayback Machine on Jan. 2020, website Omenxus https://omnexus.specialchem.com/polymer-properties/properties/dielectric-constant (Year: 2020).*
(Continued)

*Primary Examiner* — Dameon E Levi
*Assistant Examiner* — Anh N Ho
(74) *Attorney, Agent, or Firm* — Treyz Law Group, P.C.; Michael H. Lyons; Jinie M. Guihan

(57) ABSTRACT

An electronic device may have a cover layer and an antenna. A dielectric adapter may have a first surface coupled to the antenna and a second surface pressed against the cover layer. The cover layer may have a three-dimensional curvature. The second surface may have a curvature that matches the curvature of the cover layer. Biasing structures may exert a biasing force that presses the antenna against the dielectric adapter and that presses the dielectric adapter against the cover layer. The biasing force may be oriented in a direction normal to the cover layer at each point across dielectric adapter. This may serve to ensure that a uniform and reliable impedance transition is provided between the antenna and
(Continued)

free space through the cover layer over time, thereby maximizing the efficiency of the antenna.

19 Claims, 5 Drawing Sheets

(51) Int. Cl.
*H01Q 1/42* (2006.01)
*H01Q 1/22* (2006.01)

(56) References Cited

U.S. PATENT DOCUMENTS

| | | | | |
|---|---|---|---|---|
| 6,198,460 | B1 | 3/2001 | Brankovic | |
| 6,304,222 | B1 | 10/2001 | Smith et al. | |
| 7,026,997 | B2 | 4/2006 | Rahola | |
| 8,270,914 | B2 | 9/2012 | Pascolini et al. | |
| 8,325,096 | B2 | 12/2012 | Ayala Vazquez et al. | |
| 8,581,801 | B2 | 11/2013 | Puzella et al. | |
| 8,754,817 | B1 | 6/2014 | Kuo et al. | |
| 8,890,753 | B1 | 11/2014 | Lee | |
| 8,907,850 | B2 | 12/2014 | Schlub et al. | |
| 9,041,619 | B2 | 5/2015 | McMilin et al. | |
| 9,077,066 | B1 | 7/2015 | Lee | |
| 9,190,712 | B2 | 11/2015 | Hu et al. | |
| 9,356,336 | B1 | 5/2016 | Zheng et al. | |
| 9,711,858 | B1 | 7/2017 | Lee et al. | |
| 9,954,273 | B2 | 4/2018 | Shiu et al. | |
| 2003/0052824 | A1 | 3/2003 | Ollikainen et al. | |
| 2004/0080457 | A1 | 4/2004 | Guo et al. | |
| 2004/0090377 | A1 | 5/2004 | Dai et al. | |
| 2004/0108957 | A1 | 6/2004 | Umehara et al. | |
| 2004/0145523 | A1 | 7/2004 | Shamblin et al. | |
| 2004/0257283 | A1 | 12/2004 | Asano et al. | |
| 2005/0168384 | A1 | 8/2005 | Wang et al. | |
| 2005/0270238 | A1 | 12/2005 | Jo et al. | |
| 2007/0188388 | A1 | 8/2007 | Feng et al. | |
| 2009/0079639 | A1 | 3/2009 | Hotta et al. | |
| 2009/0128428 | A1 | 5/2009 | Ishizuka et al. | |
| 2009/0153407 | A1 | 6/2009 | Zhang et al. | |
| 2009/0174612 | A1* | 7/2009 | Ayala | H01Q 1/2266 343/702 |
| 2009/0189815 | A1 | 7/2009 | Hotta et al. | |
| 2009/0295646 | A1 | 12/2009 | Oh et al. | |
| 2009/0295652 | A1 | 12/2009 | Yagi et al. | |
| 2010/0149052 | A1 | 6/2010 | Nishio et al. | |
| 2010/0321253 | A1 | 12/2010 | Ayala Vazquez et al. | |
| 2011/0074638 | A1 | 3/2011 | Gong et al. | |
| 2011/0115686 | A1* | 5/2011 | Hauhe | H01Q 15/0006 343/841 |
| 2011/0193754 | A1 | 8/2011 | Schlub et al. | |
| 2011/0260939 | A1 | 10/2011 | Korva et al. | |
| 2012/0001815 | A1 | 1/2012 | Wong et al. | |
| 2012/0007791 | A1 | 1/2012 | Grbic et al. | |
| 2012/0188134 | A1 | 7/2012 | Hotta et al. | |
| 2012/0194390 | A1 | 8/2012 | Endo et al. | |
| 2012/0206302 | A1 | 8/2012 | Ramachandran et al. | |
| 2012/0242555 | A1 | 9/2012 | Hsieh et al. | |
| 2012/0249393 | A1 | 10/2012 | Hotta et al. | |
| 2012/0274538 | A1 | 11/2012 | Tsou et al. | |
| 2012/0313830 | A1 | 12/2012 | Lee | |
| 2013/0016013 | A1 | 1/2013 | Wong et al. | |
| 2013/0050036 | A1 | 2/2013 | Kashiwagi et al. | |
| 2013/0207861 | A1 | 8/2013 | Huang et al. | |
| 2013/0234903 | A1 | 9/2013 | Kwak et al. | |
| 2013/0241777 | A1 | 9/2013 | Chang et al. | |
| 2013/0278468 | A1 | 10/2013 | Yehezkely et al. | |
| 2014/0009342 | A1 | 1/2014 | Wei | |
| 2014/0062796 | A1 | 3/2014 | Chen et al. | |
| 2014/0145891 | A1 | 5/2014 | Palevsky et al. | |
| 2014/0232608 | A1 | 8/2014 | Zhao | |
| 2014/0266936 | A1 | 9/2014 | Emmanuel et al. | |
| 2015/0054708 | A1 | 2/2015 | Lin | |
| 2015/0097733 | A1 | 4/2015 | Wei | |
| 2015/0097753 | A1 | 4/2015 | Liou et al. | |
| 2015/0155616 | A1 | 6/2015 | Lin | |
| 2015/0171518 | A1 | 6/2015 | Lee et al. | |
| 2015/0236417 | A1 | 8/2015 | Iellci | |
| 2015/0236422 | A1 | 8/2015 | You et al. | |
| 2015/0288074 | A1 | 10/2015 | Harper et al. | |
| 2015/0295314 | A1 | 10/2015 | Oh | |
| 2015/0311960 | A1* | 10/2015 | Samardzija | H05K 5/0017 455/90.3 |
| 2016/0028150 | A1 | 1/2016 | Chou et al. | |
| 2016/0043467 | A1 | 2/2016 | Desclos et al. | |
| 2016/0111797 | A1 | 4/2016 | Shin et al. | |
| 2016/0156102 | A1 | 6/2016 | Azad et al. | |
| 2016/0164192 | A1 | 6/2016 | Lin | |
| 2016/0254832 | A1 | 9/2016 | Yoo et al. | |
| 2016/0294045 | A1* | 10/2016 | Shiu | H01Q 9/42 |
| 2017/0040702 | A1 | 2/2017 | West et al. | |
| 2017/0048363 | A1 | 2/2017 | Lee et al. | |
| 2017/0149127 | A1* | 5/2017 | Li | H01Q 9/42 |
| 2017/0201011 | A1 | 7/2017 | Khripkov et al. | |
| 2017/0250459 | A1 | 8/2017 | Kashiwagi | |
| 2018/0094981 | A1* | 4/2018 | Honjo | G01J 5/0025 |
| 2018/0277951 | A1 | 9/2018 | Nishikawa et al. | |
| 2018/0278287 | A1 | 9/2018 | Nishikawa et al. | |
| 2019/0067817 | A1 | 2/2019 | Oh et al. | |
| 2019/0089052 | A1* | 3/2019 | Yong | H01Q 9/0407 |
| 2019/0097301 | A1 | 3/2019 | Wu et al. | |
| 2019/0190140 | A1* | 6/2019 | Lavin | H01Q 1/422 |
| 2019/0214721 | A1 | 7/2019 | Hu et al. | |
| 2019/0260127 | A1 | 8/2019 | Shi et al. | |
| 2020/0161745 | A1 | 5/2020 | Khripkov et al. | |
| 2020/0212557 | A1* | 7/2020 | Descloux | H01Q 1/28 |
| 2020/0212598 | A1 | 7/2020 | Gonzalez et al. | |
| 2021/0408674 | A1* | 12/2021 | Chang | H01B 3/441 |

FOREIGN PATENT DOCUMENTS

| | | | | |
|---|---|---|---|---|
| EP | 3422475 | A1 | 1/2019 | |
| WO | 2010032066 | A1 | 3/2010 | |
| WO | 2010137061 | A1 | 12/2010 | |
| WO | WO-2020207276 | A1 * | 10/2020 | H01Q 1/243 |

OTHER PUBLICATIONS

"Polymer and Plastic Composites Information", captured from Wayback Machine in Jan. 2018, GlobalSpec website (Year: 2018).*
"Adhere definition", dictionary.com, https://www.dictionary.com/browse/adhere (Year: 2024).*

* cited by examiner

ELECTRONIC DEVICES HAVING ANTENNAS THAT RADIATE THROUGH THREE-DIMENSIONALLY CURVED COVER LAYERS

This application is a continuation of U.S. patent application Ser. No. 17/008,862, filed Sep. 1, 2020, which is hereby incorporated by reference herein in its entirety.

BACKGROUND

This relates to electronic devices, and more particularly, to electronic devices with wireless communications circuitry.

Electronic devices are often provided with wireless communications capabilities. An electronic device with wireless communications capabilities has wireless communications circuitry with one or more antennas. Wireless transceiver circuitry in the wireless communications circuitry uses the antennas to transmit and receive radio-frequency signals.

It can be challenging to form a satisfactory antenna for an electronic device. If care is not taken, differential impedance loading across the antenna may cause the antenna to exhibit unsatisfactory wireless performance.

SUMMARY

An electronic device may include a housing and wireless circuitry. The housing may include a three-dimensionally curved dielectric cover layer. The wireless circuitry may include an antenna. The antenna may include an antenna ground and an antenna resonating element on an antenna carrier. A dielectric adapter may be mounted to the antenna carrier overlapping the antenna resonating element. The antenna may radiate through the dielectric adapter and the three-dimensionally curved dielectric cover layer.

The dielectric adapter may have a first surface coupled to the antenna resonating element. The first surface may be planar or may be curved about a single axis. The dielectric adapter may have an opposing second surface that is pressed flush against an interior surface of the three-dimensionally curved dielectric cover layer. The second surface may be a three-dimensionally curved surface. The second surface may have a three-dimensional curvature that matches the three-dimensional curvature of the three-dimensionally curved dielectric cover layer.

The antenna carrier may include biasing structures. The biasing structures may include first and second rigid substrates and a foam member interposed between the first and second rigid substrates. The biasing structures may exert a biasing force that presses the antenna resonating element against the dielectric adapter and that presses the dielectric adapter against the three-dimensionally curved dielectric cover layer. The dielectric adapter may transfer the biasing force to the three-dimensionally curved dielectric cover layer. The biasing force may be oriented in a direction normal to the three-dimensionally curved dielectric cover layer at each point across dielectric adapter. This may serve to ensure that a uniform and reliable impedance transition is provided between the antenna and free space over time, thereby maximizing the efficiency of the antenna.

DETAILED DESCRIPTION

Figure 1:
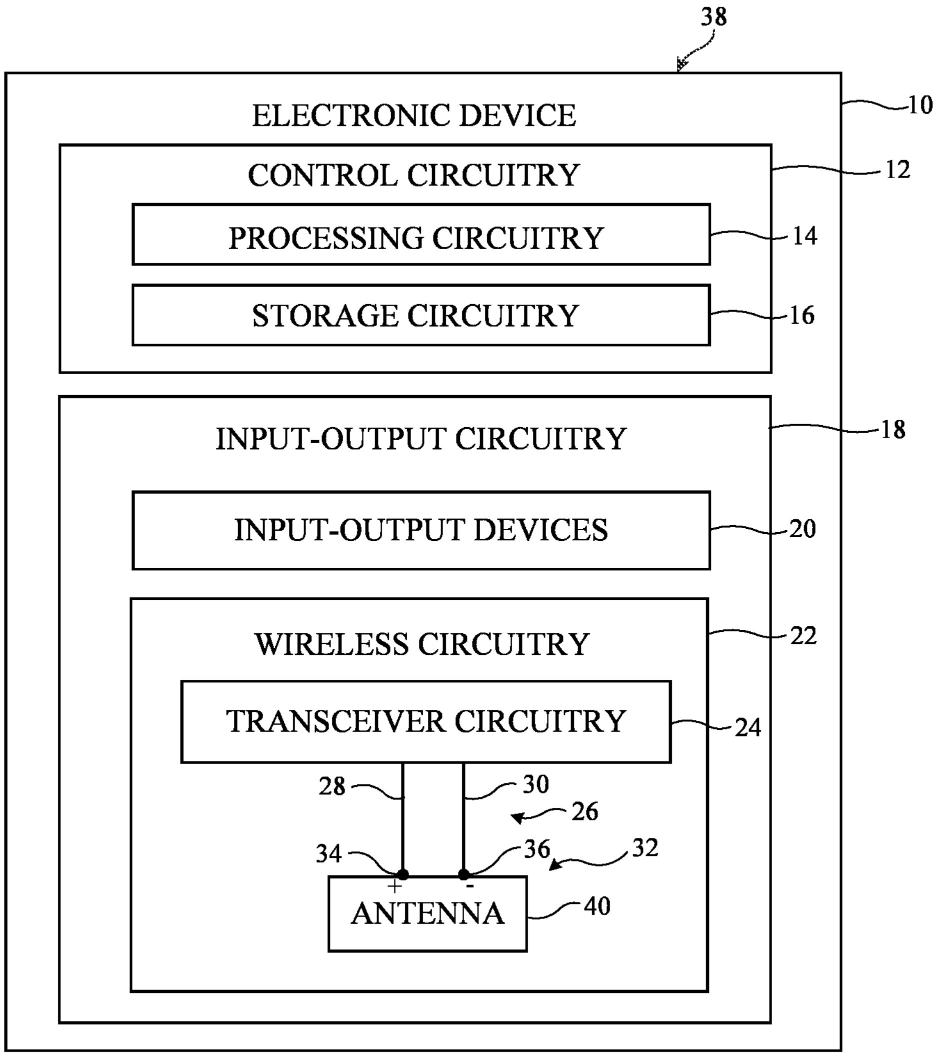
FIG. 1 is a schematic diagram of an illustrative electronic device having an antenna in accordance with some embodiments.

An electronic device such as electronic device 10 of FIG. 1 may be provided with wireless circuitry. The wireless circuitry may include antennas. Electronic device 10 may be a computing device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head such as a head mounted (display) device, or other types of wearable or miniature device, a television, a computer display that does not contain an embedded computer, a gaming device, a navigation device, a gaming controller, a remote control device, a peripheral device, an embedded system such as a system in which electronic equipment with a display is mounted in a kiosk or automobile, a wireless internet-connected voice-controlled speaker, a wireless base station or access point, equipment that implements the functionality of two or more of these devices, or other electronic equipment.

As shown in FIG. 1, device 10 may include control circuitry 12. Control circuitry 12 may include storage such as storage circuitry 16. Storage circuitry 16 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 12 may include processing circuitry such as processing circuitry 14. Processing circuitry 14 may be used to control the operation of device 10. Processing circuitry 14 may include on one or more microprocessors, microcontrollers, digital signal processors, host processors, baseband processor integrated circuits, application specific integrated circuits, central processing units (CPUs), etc. Control circuitry 12 may be configured to perform operations in device 10 using hardware (e.g., dedicated hardware or circuitry), firmware, and/or software. Software code for performing operations in device 10 may be stored on storage circuitry 16 (e.g., storage circuitry 16 may include nontransitory (tangible) computer readable storage media that stores the software code). The software code may sometimes be referred to as program instructions, software, data, instructions, or code. Software code stored on storage circuitry 16 may be executed by processing circuitry 14.

Control circuitry 12 may be used to run software on device 10 such as internet browsing applications, voice-over-internet-protocol (VOIP) telephone call applications, email applications, media playback applications, operating system functions, etc. To support interactions with external equipment, control circuitry 12 may be used in implementing communications protocols. Communications protocols that may be implemented using control circuitry 12 include internet protocols, wireless local area network protocols (e.g., IEEE 802.11 protocols—sometimes referred to as Wi-Fi®), protocols for other short-range wireless communications links such as the Bluetooth® protocol or other WPAN protocols, IEEE 802.11ad protocols, cellular telephone protocols, MIMO protocols, antenna diversity protocols, satellite navigation system protocols, antenna-based spatial ranging protocols (e.g., radio detection and ranging (RADAR) protocols or other desired range detection protocols for signals conveyed at millimeter and centimeter wave frequencies), etc. Each communication protocol may be associated with a corresponding radio access technology (RAT) that specifies the physical connection methodology used in implementing the protocol.

Device 10 may include input-output circuitry 18. Input-output circuitry 18 may include input-output devices 20. Input-output devices 20 may be used to allow data to be supplied to device 10 and to allow data to be provided from device 10 to external devices. Input-output devices 20 may include user interface devices, data port devices, and other input-output components. For example, input-output devices 20 may include touch sensors, displays (e.g., touch-sensitive displays), light-emitting components such as displays without touch sensor capabilities, buttons (mechanical, capacitive, optical, etc.), scrolling wheels, touch pads, key pads, keyboards, microphones, cameras, buttons, speakers, status indicators, audio jacks and other audio port components, digital data port devices, motion sensors (accelerometers, gyroscopes, and/or compasses that detect motion), capacitance sensors, proximity sensors, magnetic sensors, force sensors (e.g., force sensors coupled to a display to detect pressure applied to the display), etc. In some configurations, keyboards, headphones, displays, pointing devices such as trackpads, mice, and joysticks, and other input-output devices may be coupled to device 10 using wired or wireless connections (e.g., some of input-output devices 20 may be peripherals that are coupled to a main processing unit or other portion of device 10 via a wired or wireless link).

Input-output circuitry 18 may include wireless circuitry 22 to support wireless communications. Wireless circuitry 22 may include radio-frequency (RF) transceiver circuitry 24 formed from one or more integrated circuits, power amplifier circuitry, low-noise input amplifiers, passive RF components, one or more antennas such as antenna 40, transmission lines such as transmission line 26, and other circuitry for handling wireless RF signals. Wireless signals can also be sent using light (e.g., using infrared communications). While control circuitry 12 is shown separately from wireless circuitry 22 in the example of FIG. 1 for the sake of clarity, wireless circuitry 22 may include processing circuitry that forms a part of processing circuitry 14 and/or storage circuitry that forms a part of storage circuitry 16 of control circuitry 12 (e.g., portions of control circuitry 12 may be implemented on wireless circuitry 22). As an example, control circuitry 12 (e.g., processing circuitry 14) may include baseband processor circuitry or other control components that form a part of wireless circuitry 22.

Transceiver circuitry 24 may include transceiver circuitry for handling transmission and/or reception of radio-frequency signals in various radio-frequency communications bands. For example, transceiver circuitry 24 may handle wireless local area network (WLAN) communications bands such as the 2.4 GHz and 5 GHz Wi-Fi® (IEEE 802.11) communications bands, wireless personal area network (WPAN) communications bands such as the 2.4 GHz Bluetooth® communications band, cellular telephone communications bands such as a cellular low band (LB) (e.g., 600 to 960 MHz), a cellular low-midband (LMB) (e.g., 1400 to 1550 MHz), a cellular midband (MB) (e.g., from 1700 to 2200 MHz), a cellular high band (HB) (e.g., from 2300 to 2700 MHz), a cellular ultra-high band (UHB) (e.g., from 3300 to 5000 MHz, or other cellular communications bands between about 600 MHz and about 5000 MHz or higher (e.g., 3G bands, 4G LTE bands, 5G New Radio Frequency Range 1 (FR1) bands below 10 GHz, 5G New Radio Frequency Range 2 (FR2) bands at millimeter and centimeter wavelengths between 20 and 60 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), an ultra-wideband (UWB) communications band supported by the IEEE 802.15.4 protocol and/or other UWB communications protocols (e.g., a first UWB communications band at 6.5 GHz and/or a second UWB communications band at 8.0 GHz), Industry, Science, and Medical (ISM) bands, unlicensed communications bands around 6 GHz such as a communications band that includes frequencies from about 5.925 GHz to 7.125 GHz, other communications bands up to about 8-9 GHz, and/or any other desired communications bands. The communications bands handled by transceiver circuitry 24 may sometimes be referred to herein as frequency bands or simply as “bands,” and may span corresponding ranges of frequencies.

In scenarios where transceiver circuitry 24 includes UWB transceiver circuitry, the UWB transceiver circuitry may support communications using the IEEE 802.15.4 protocol and/or other ultra-wideband communications protocols. Ultra-wideband radio-frequency signals may be based on an impulse radio signaling scheme that uses band-limited data pulses. Ultra-wideband radio-frequency signals may have any desired bandwidths such as bandwidths between 499 MHz and 1331 MHz, bandwidths greater than 500 MHz, etc. The presence of lower frequencies in the baseband may sometimes allow ultra-wideband signals to penetrate through objects such as walls. In an IEEE 802.15.4 system, a pair of electronic devices may exchange wireless time stamped messages. Time stamps in the messages may be analyzed to determine the time of flight of the messages and thereby determine the distance (range) between the devices and/or an angle between the devices (e.g., an angle of arrival of incoming radio-frequency signals). The ultra-wideband transceiver circuitry may operate (i.e., convey radio-frequency signals) in frequency bands such as an ultra-wideband communications band between about 5 GHz and about 8.5 GHz (e.g., a 6.5 GHz UWB communications band, an 8 GHz UWB communications band, and/or at other suitable frequencies).

In general, transceiver circuitry 24 may cover (handle) any desired frequency bands of interest. Transceiver circuitry 24 may convey radio-frequency signals using antenna 40 (e.g., antenna 40 may convey the radio-frequency signals for the transceiver circuitry). The term "convey radio-frequency signals" as used herein means the transmission and/or reception of the radio-frequency signals (e.g., for performing unidirectional and/or bidirectional wireless communications with external wireless communications equipment). Antenna 40 may transmit the radio-frequency signals by radiating the radio-frequency signals into free space (or to freespace through intervening device structures such as a dielectric cover layer). Antenna 40 may additionally or alternatively receive the radio-frequency signals from free space (e.g., through intervening devices structures such as a dielectric cover layer). The transmission and reception of radio-frequency signals by antenna 40 each involve the excitation or resonance of antenna currents on an antenna resonating element in the antenna by the radio-frequency signals within the frequency band(s) of operation of the antenna.

Antennas such as antenna 40 may be formed using any suitable antenna types. For example, antenna 40 may include a resonating element formed from loop antenna structures, patch antenna structures, inverted-F antenna structures, slot antenna structures, planar inverted-F antenna structures, helical antenna structures, monopole antenna structures, strip antenna structures, dipole antenna structures, hybrids of these designs, etc. Parasitic elements may be included in antennas 40 to adjust antenna performance. If desired, antenna 40 may be provided with a conductive cavity that backs the antenna resonating element of antenna 40 (e.g., antenna 40 may be a cavity-backed antenna). Different types of antennas may be used for different bands and combinations of bands. For example, one type of antenna may be used in forming a local wireless link antenna and another type of antenna may be used in forming a remote wireless link antenna. In some configurations, different antennas may be used in handling different bands for radio-frequency transceiver circuitry 24. Alternatively, a given antenna 40 may cover one or more bands.

As shown in FIG. 1, transceiver circuitry 24 may be coupled to antenna feed 32 of antenna 40 using transmission line 26. Antenna feed 32 may include a positive antenna feed terminal such as positive antenna feed terminal 34 and may include a ground antenna feed terminal such as ground antenna feed terminal 36. Transmission line 26 may be formed from metal traces on a printed circuit, cables, or other conductive structures. Transmission line 26 may have a positive transmission line signal path such as path 28 that is coupled to positive antenna feed terminal 34. Transmission line 26 may have a ground transmission line signal path such as path 30 that is coupled to ground antenna feed terminal 36. Path 28 may sometimes be referred to herein as signal conductor 28 and path 30 may sometimes be referred to herein as ground conductor 30.

Transmission line paths such as transmission line 26 may be used to route antenna signals within device 10 (e.g., to convey radio-frequency signals between radio-frequency transceiver circuitry 24 and antenna feed 32 of antenna 40). Transmission lines in device 10 may include coaxial cables, microstrip transmission lines, stripline transmission lines, edge-coupled microstrip transmission lines, edge-coupled stripline transmission lines, transmission lines formed from combinations of transmission lines of these types, etc. Transmission lines in device 10 such as transmission line 26 may be integrated into rigid and/or flexible printed circuit boards. In one suitable arrangement, transmission lines such as transmission line 26 may also include transmission line conductors (e.g., signal conductors 28 and ground conductors 30) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive). Filter circuitry, switching circuitry, impedance matching circuitry, and other circuitry may be interposed within the paths formed using transmission lines such as transmission line 26 and/or circuits such as these may be incorporated into antenna 40 (e.g., to support antenna tuning, to support operation in desired frequency bands, etc.).

Electronic device 10 may be provided with electronic device housing 38. Housing 38, which may sometimes be referred to as a case, may be formed of plastic, glass, ceramics, fiber composites, metal (e.g., stainless steel, aluminum, etc.), other suitable materials, or a combination of these materials. Housing 38 may be formed using a unibody configuration in which some or all of housing 38 is machined or molded as a single structure or may be formed using multiple structures (e.g., an internal frame structure covered with one or more outer housing layers). Configurations for housing 38 in which housing 38 includes support structures (a stand, leg(s), handles, frames, etc.) may also be used. In one suitable arrangement that is described herein as an example, housing 38 includes a three-dimensionally curved dielectric cover layer. Antenna 40 may transmit radio-frequency signals through the three-dimensionally curved dielectric cover layer and/or may receive radio-frequency signals through the three-dimensionally curved dielectric cover layer.

In practice, the number of frequency bands that are used to convey radio-frequency signals for device 10 tends to increase over time. In some scenarios, device 10 may include a different respective antenna 40 for handling each of these bands. However, increasing the number of antennas 40 in device 10 may consume an undesirable amount of space, power, and other resources in device 10. If desired, a given antenna 40 in device 10 may handle communications in multiple frequency bands to optimize resource consumption within device 10. In one suitable arrangement that is described herein as an example, a given antenna 40 in device 10 may be configured to handle WLAN frequency bands at 2.4 GHz and 5.0 GHz, unlicensed bands around 6 GHz (e.g., between 5.925 and 7.125 GHz), and/or UWB communications bands at 6.5 GHz and 8.0 GHz. However, it can be challenging to provide an antenna 40 with structures that exhibit sufficient bandwidth to cover each of these frequency bands (e.g., from below 2.4 GHz to above 9.0 GHz) with satisfactory antenna efficiency, particularly when the size of the antenna is constrained by the form factor of device 10.

Figure 2:
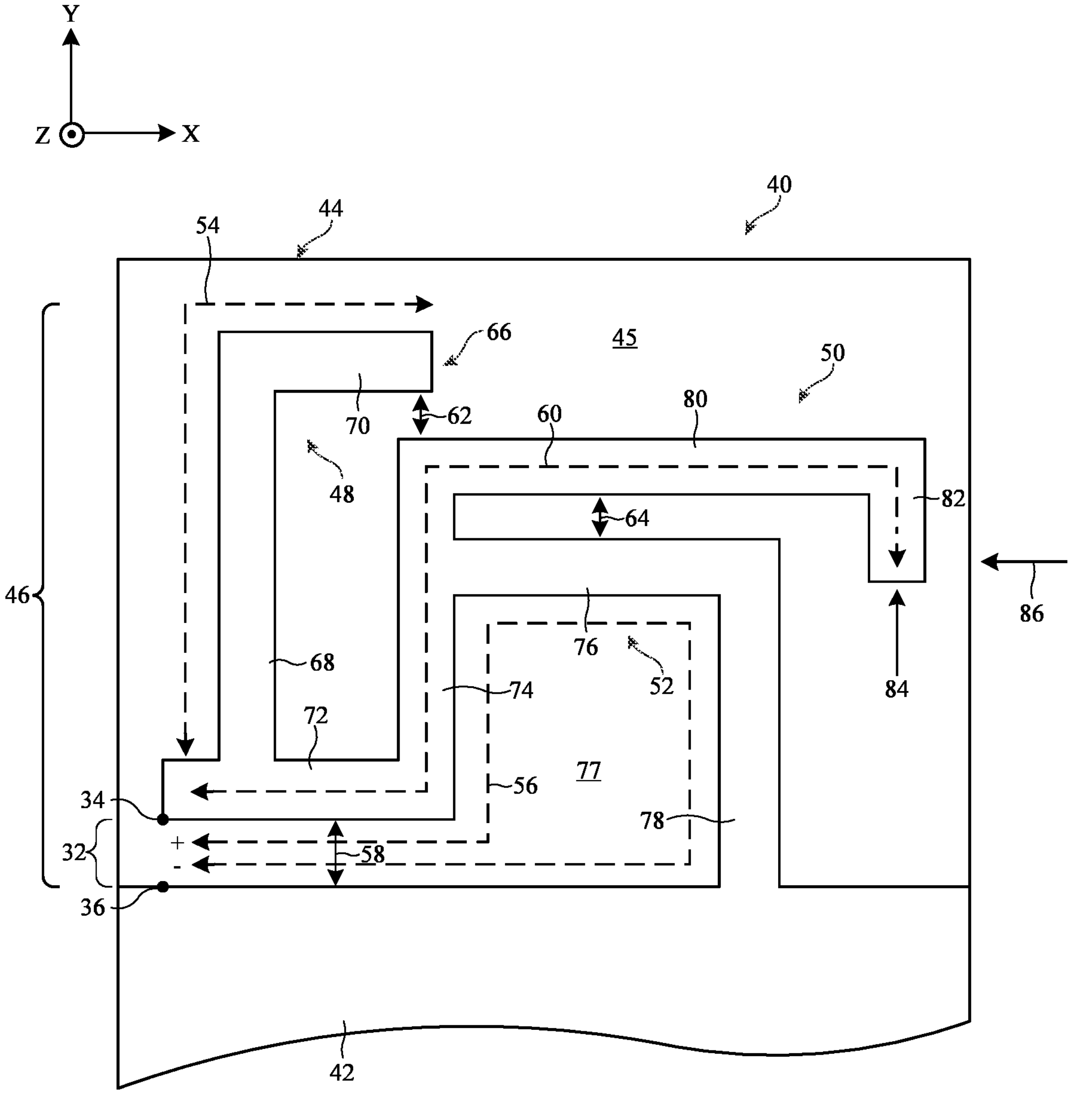
FIG. 2 is a top view of an illustrative antenna in accordance with some embodiments.

FIG. 2 is a diagram of an illustrative antenna 40 that may exhibit a sufficiently wide bandwidth so as to cover each of these frequency bands with satisfactory antenna efficiency. As shown in FIG. 2, antenna 40 may include an antenna resonating element such as antenna resonating element 46 and ground structures such as antenna ground 42. Antenna resonating element 46 may sometimes be referred to herein as antenna radiating element 46 or antenna element 46. Antenna ground 42 may sometimes be referred to herein as ground plane 42 or ground structures 42.

Antenna resonating element 46 and antenna ground 42 may be formed from conductive traces patterned onto a lateral surface such as surface 45 of an underlying dielectric substrate such as dielectric antenna carrier 44 (sometimes referred to herein as antenna support structure 44 or dielectric support structure 44). Dielectric antenna carrier 44 may be formed from plastic, ceramic, foam, adhesive, combinations of these, or any other dielectric materials. If desired, antenna ground 42 and/or antenna resonating element 46 may be formed from conductive traces patterned onto a flexible printed circuit that is layered over surface 45 of dielectric antenna carrier 44. Surface 45 may be planar or curved, may have planar and curved portions, or may have any other desired geometry. Examples in which surface 45 is curved are described herein as an example. Surface 45 may be curved if desired.

Antenna 40 may be fed using antenna feed 32. Antenna feed 32 may be coupled between antenna resonating element 46 and antenna ground 42 (e.g., across gap 58 at surface 45 of dielectric antenna carrier 44). For example, antenna resonating element 46 may have a feed segment such as feed segment 72. Feed segment 72 may extend along a corresponding longitudinal axis (e.g., a longitudinal axis oriented parallel to the X-axis of FIG. 2) and may be separated from antenna ground 42 by gap 58. Positive antenna feed terminal 34 of antenna feed 32 may be coupled to feed segment 72 whereas ground antenna feed terminal 36 is coupled to antenna ground 42 (e.g., at opposing sides of gap 58).

Antenna resonating element 46 may have multiple arms or branches. In the example of FIG. 2, antenna resonating element 46 includes a first arm (branch) 52 extending from feed segment 72, a second arm (branch) 50 extending from first arm 52, and a third arm 48 extending from feed segment 72. Arms 52, 50, and 48 may sometimes be referred to herein as antenna resonating element arms or antenna arms.

As shown in FIG. 2, first arm 52 may have a first segment 74 extending from an end of feed segment 72 (e.g., first segment 74 may have a first end at the end of feed segment 72 that is opposite to antenna feed 32). First segment 74 may extend at a non-parallel angle (e.g., a perpendicular angle) with respect to feed segment 72 (e.g., the longitudinal axis of first segment 74 may extend parallel to the Y-axis of FIG. 2 and perpendicular to the longitudinal axis of feed segment 72). First arm 52 may have a second segment 76 extending from an end of first segment 74 (e.g., first segment 74 may have a second end opposite feed segment 72, and second segment 76 may have a first end at the second end of first segment 74). Second segment 76 may extend at a non-parallel angle (e.g., a perpendicular angle) with respect to first segment 74 (e.g., the longitudinal axis of second segment 76 may extend parallel to the X-axis and feed segment 72 and may extend perpendicular to the longitudinal axis of first segment 74 of FIG. 2).

First arm 52 may also have a third segment 78 extending from an end of second segment 76 (e.g., second segment 76 may have a second end opposite first segment 74, and third segment 78 may have a first end at the second end of second segment 76). Third segment 78 may extend at a non-parallel angle (e.g., a perpendicular angle) with respect to second segment 76 (e.g., the longitudinal axis of third segment 78 may extend parallel to the Y-axis and the longitudinal axis of first segment 74 of FIG. 2). Third segment 78 may have a second end opposite second segment 76. The second end of third segment 78 may be coupled to antenna ground 42 (e.g., at a grounding location). This may configure first arm 52 to form a loop-shaped path 56 (with feed segment 72 and antenna ground 42) for antenna currents flowing between positive antenna feed terminal 34 and ground antenna feed terminal 36. Loop-shaped path 56 (sometimes referred to herein as loop path 56) may run around central opening 77 at surface 45 of dielectric antenna carrier 44.

Second arm 50 may have a first segment 80 extending from the second end of segment 74 of first arm 52 and extending from the first end of segment 76 of first arm 52 (e.g., first segment 80 of second arm 50 may have a first end at the ends of segments 74 and 76 of first arm 52). First segment 80 of second arm 50 may extend parallel to segment 76 of first arm 52 (e.g., first segment 80 of second arm 50 may extend along a longitudinal axis oriented parallel to the longitudinal axis of segment 76 of first arm 52). Second arm 50 may have a second segment 82 extending from an end of first segment 80 to tip 84 of second arm 50 (e.g., first segment 80 may have a second end at second segment 82 of second arm 50). Second segment 82 of second arm 50 may extend at a non-parallel angle with respect to first segment 80 of second arm 50 (e.g., along a longitudinal axis parallel to the Y-axis). First segment 80 of second arm 50 may be separated from segment 76 of first arm 52 (e.g., along the entire length of first segment 80) by gap 64. Second segment 82 of second arm 50 may also be separated from segment 78 of first arm 52 by gap 64 if desired. Gap 64 may form a distributed capacitance along the length of first segment 80 of second arm 50 (e.g., a distributed capacitance between segment 80 of second arm 50 and segment 76 of first arm 52). The distributed capacitance formed by gap 64 may be used to tune the frequency response of first arm 52 and/or second arm 50.

Third arm 48 may have a first segment 68 extending from feed segment 72 (e.g., first segment 68 of third arm 48 may have a first end at feed segment 72). First segment 68 of third arm 48 may extend at a non-parallel angle (e.g., a perpendicular angle) with respect to feed segment 72 (e.g., the longitudinal axis of first segment 68 of third arm 48 may be oriented parallel to the longitudinal axes of segments 74 and 78 of first arm 52 and segment 82 of second arm 50). Third arm 48 may also have a second segment 70 extending from a second end of first segment 68 to tip 66 of third arm 48. Second segment 70 of third arm 48 may extend at a non-parallel angle (e.g., a perpendicular angle) with respect to first segment 68 (e.g., second segment 70 may extend along a longitudinal axis oriented parallel to the longitudinal axes of feed segment 72, segment 76 of first arm 52, and segment 80 of second arm 50). In other words, third arm 48 may be an L-shaped strip (e.g., an L-shaped arm) extending from feed segment 72. A portion of second segment 70 of third arm 48 (e.g., at tip 66) may be separated from second arm 50 by gap 62.

During signal transmission, antenna feed 32 receives radio-frequency signals from transceiver circuitry 24 of FIG. 1. Corresponding (radio-frequency) antenna currents may flow on antenna resonating element 46 and antenna ground 42. The antenna currents may radiate the radio-frequency signals (e.g., as wireless signals) that are transmitted into free space. During signal reception, antenna resonating element 46 may receive (wireless) radio-frequency signals from free space. Corresponding antenna currents are then produced on antenna resonating element 46. The radio-frequency signals corresponding to the antenna currents are then transmitted to transceiver circuitry 24 (FIG. 1) via antenna feed 32.

The lengths of first arm 52, second arm 50, third arm 48, and/or feed segment 72 may be selected so that antenna 40 operates in (handles) desired frequency bands of interest. For example, the length of antenna 40 from positive antenna feed terminal 34 to ground antenna feed terminal 36 through feed segment 72, segments 74, 76, and 78 of first arm 52, and antenna ground 42 (e.g., the length of loop path 56) may be selected to configure antenna resonating element 46 to resonate in a first frequency band. The length of loop path 56 may, for example, be approximately equal to (e.g., within 15% of) one-half of the effective wavelength corresponding to a frequency in the first frequency band. The effective wavelength is equal to a free space wavelength multiplied by a constant value that is determined based on the dielectric constant of dielectric antenna carrier 44. The first frequency band may, for example, include frequencies between about 5.0 GHz and 6.0 GHz (e.g., for conveying signals in a 5.0 GHz wireless local area network band and/or unlicensed frequencies within the first frequency band). The first frequency band may sometimes be referred to herein as the midband of antenna 40.

During signal transmission, antenna currents in the first frequency band may flow along loop path 56 (e.g., along the perimeter of the conductive structures forming loop path 56). Loop path 56 may radiate corresponding (wireless) radio-frequency signals in the first frequency band. Similarly, during signal reception, radio-frequency signals received from free space in the first frequency band may cause antenna currents in the first frequency band to flow along loop path 56. In this way, feed segment 72, segments 74, 76, and 78 of first arm 52, and the portion of antenna ground 42 extending from segment 78 to ground antenna feed terminal 36 may form a loop antenna resonating element for antenna 40 (e.g., first arm 52 may form part of the loop antenna resonating element). If desired, gap 64 may introduce a (distributed) capacitance to loop path 56 that serves to tune the frequency response of loop path 56 in the first frequency band. Increasing the width of gap 64 may decrease this capacitance whereas decreasing the width of gap 64 may increase the capacitance. Gap 64 may, for example, have a width of 0.01-0.10 mm (e.g., approximately 0.05 mm), 0.01-0.50 mm, greater than 0.50 mm, etc.

At the same time, the length of antenna resonating element 46 from positive antenna feed terminal 34 to tip 84 of second arm 50 through feed segment 72, segment 74 of first arm 52, and segments 80 and 82 of second arm 50 (e.g., the length of path 60) may be selected to configure antenna resonating element 46 to resonate in a second frequency band. The length of path 60 may, for example, be approximately equal to (e.g., within 15% of) one-quarter of the effective wavelength corresponding to a frequency in the second frequency band. The second frequency band may, for example, include frequencies below 2.5 GHz (e.g., for conveying signals in a 2.4 GHz wireless local area network band). The second frequency band may sometimes be referred to herein as the low band of antenna 40.

During signal transmission, antenna currents in the second frequency band may flow along path 60 between positive antenna feed terminal 34 and tip 84 (e.g., along the perimeter of the conductive structures forming path 60 of antenna resonating element 46). Path 60 may radiate corresponding (wireless) radio-frequency signals in the second frequency band. Similarly, during signal reception, radio-frequency signals received from free space in the second frequency band may cause antenna currents in the second frequency band to flow along path 60. Segments 76 and 78 of first arm 52 may form a return path to antenna ground 42 for the antenna currents in the second frequency band (e.g., portions of first arm 52 may form a return path to ground for second arm 50 in the second frequency band while concurrently resonating in the first frequency band with the remainder of loop path 56). In this way, second arm 50 and first arm 52 may collectively form an inverted-F antenna resonating element in the second frequency band for antenna 40 (e.g., first arm 52 may form both part of a loop antenna resonating element in the first frequency band and part of an inverted-F antenna resonating element in the second frequency band). If desired, gap 64 may introduce a (distributed) capacitance to second arm 50 that serves to tune the frequency response of path 60 in the second frequency band.

In addition, the length of third arm 48 (e.g., path 54) may be selected to configure antenna resonating element 46 to resonate in a third frequency band. The length of third arm 48 (e.g., path 54) may, for example, be approximately equal to (e.g., within 15% of) one-quarter of the effective wavelength corresponding to a frequency in the third frequency band. The third frequency band may, for example, include frequencies between about 5.0 GHz and 9.0 GHz (e.g., for conveying signals in a 5.0 GHz wireless local area network band, for conveying signals in an unlicensed band such as a frequency band between 5.925 and 7.125 GHz, for conveying signals in a 6.5 GHz UWB communications band, and/or for conveying signals in an 8.0 GHz UWB communications band). The third frequency band may sometimes be referred to herein as the high band of antenna 40. Third arm 48 may sometimes be referred to herein as the high band arm of antenna 40. Second arm 50 may sometimes be referred to herein as the low band arm of antenna 40. First arm 52 may sometimes be referred to herein as the midband arm of antenna 40.

During signal transmission, antenna currents in the third frequency band may flow along path 54 between positive antenna feed terminal 34 and tip 66 (e.g., along the perimeter of the conductive structures forming third arm 48). Third arm 48 (e.g., path 54) may radiate corresponding (wireless) radio-frequency signals in the third frequency band. Similarly, during signal reception, radio-frequency signals received from free space in the third frequency band may cause antenna currents in the third frequency band to flow along path 54. In this way, third arm 48 may form a monopole antenna resonating element (e.g., an L-shaped antenna resonating element) in the third frequency band for antenna 40. If desired, gap 62 may introduce a capacitance to third arm 48 that serves to tune the frequency response of third arm 48 and/or that serves to perform impedance matching for third arm 48 in the third frequency band.

When configured in this way, antenna 40 may convey (e.g., transmit and/or receive) radio-frequency signals in each of the first, second, and third frequency bands with satisfactory antenna efficiency. Antenna 40 may, for example, exhibit a wideband response and may exhibit satisfactory antenna efficiency from the lower limit of the second frequency band to the upper limit of the third frequency band (e.g., from below 2.4 GHz to over 9.0 GHz).

The example of FIG. 2 is merely illustrative. In another suitable arrangement, feed segment 72 may be omitted and third arm 48 may extend from antenna ground 42 (e.g., to the left of antenna feed 32 and feed segment 72). In yet another suitable arrangement, third arm 48 may be coupled to antenna ground 42 and may be located within central opening 77 of first arm 52. In general, antenna 40 may have any desired antenna resonating element structures having any desired shape for covering any desired frequencies.

Figure 3:
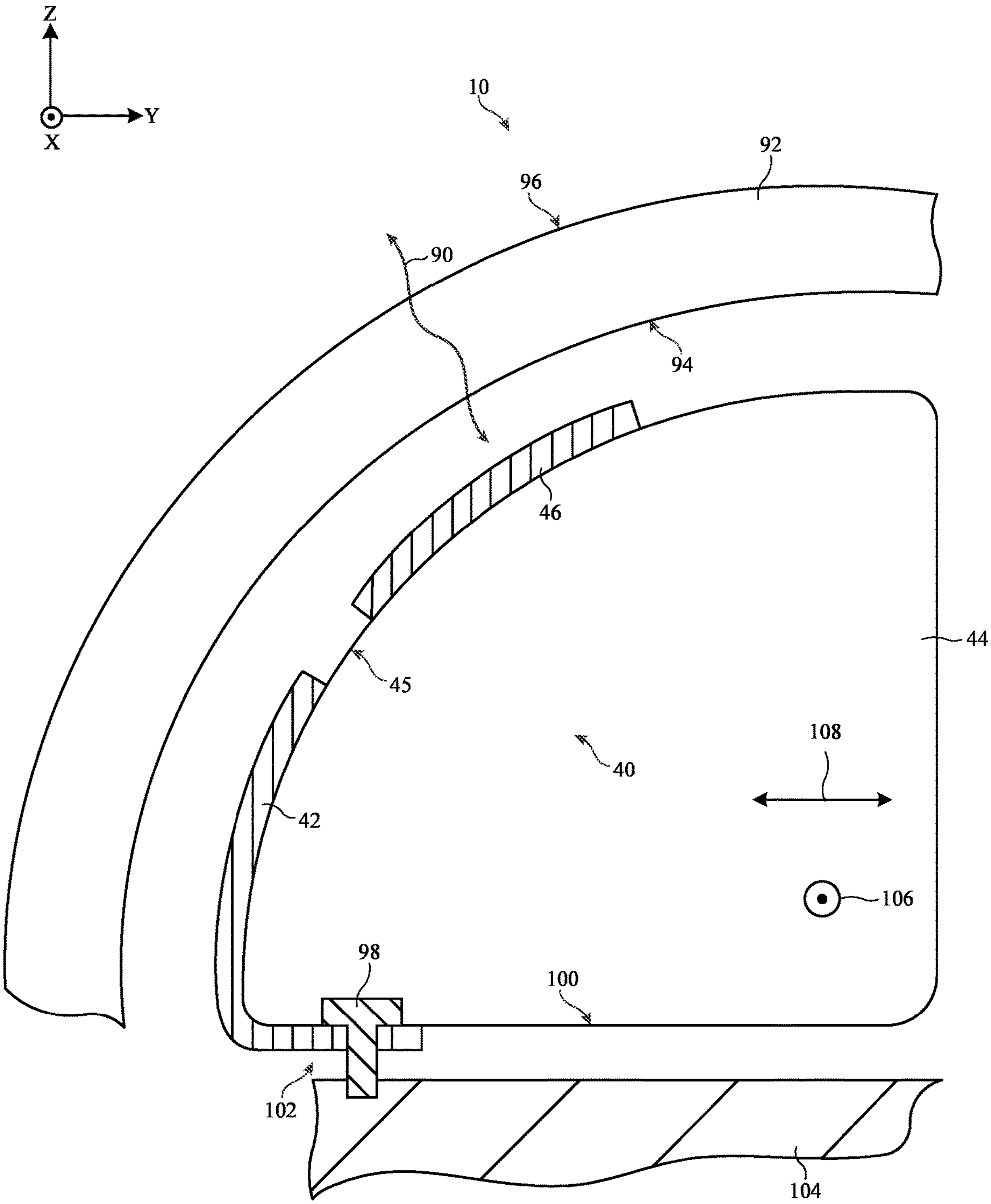
FIG. 3 is a cross-sectional side view of an illustrative electronic device having a three-dimensionally curved cover layer and an antenna mounted behind the three-dimensionally curved cover layer in accordance with some embodiments.

FIG. 3 is a cross-sectional side view (e.g., as taken in the direction of arrow 86 of FIG. 2) showing how antenna 40 may be integrated into device 10. As shown in FIG. 3, dielectric antenna carrier 44 may have a curved surface such as surface 45 and at least one additional surface such as bottom surface 100. Antenna resonating element 46 may be formed from conductive traces patterned directly onto surface 45 of dielectric antenna carrier 44. Antenna ground 42 may be formed from conductive traces patterned directly onto surface 45 and bottom surface 100 of dielectric antenna carrier 44. The conductive traces of antenna ground 42 and antenna resonating element 46 may be patterned onto dielectric antenna carrier 44 using a Laser Direct Structuring (LDS) process if desired (e.g., dielectric antenna carrier 44 may be formed from an LDS plastic material). In another suitable arrangement, antenna ground 42 and antenna resonating element 46 may be patterned onto a flexible printed circuit that is layered onto surface 45 of dielectric antenna carrier 44.

Antenna ground 42 and dielectric antenna carrier 44 may include a hole or opening such as hole 102. A fastening structure such as screw 98 may extend through hole 102 to secure antenna ground 42 and dielectric antenna carrier 44 to other device components such as system ground 104. Screw 98 may be a conductive screw that serves to short antenna ground 42 to system ground 104 (e.g., system ground 104 may form part of the ground plane for antenna 40). Screw 98 may be replaced by any desired conductive fastening structures such as a conductive clip, a conductive spring, a conductive pin, a conductive bracket, conductive adhesive, welds, solder, combinations of these, etc.

Device 10 may include a cover layer such as dielectric cover layer 92. Dielectric cover layer 92 may form part of housing 38 of FIG. 1 for device 10. Dielectric cover layer 92 may have an interior surface 94 at the interior of device 10 (e.g., facing dielectric antenna carrier 44) and may have an opposing exterior surface 96 at the exterior of device 10. Interior surface 94 and/or exterior surface 96 may be curved surfaces. Exterior surface 96 may extend parallel to interior surface 94 if desired (e.g., exterior surface 96 and interior surface 94 may have the same curvature). Dielectric cover layer 92 may be formed from any desired dielectric materials such as plastic, ceramic, rubber, glass, wood, fabric, sapphire, combinations of these or other materials, etc.

Dielectric antenna carrier 44 may be mounted within device 10 such that surface 45 faces dielectric cover layer 92. Antenna resonating element 46 may be separated from interior surface 94 of dielectric cover layer 92 or may be pressed against interior surface 94. Antenna 40 may convey radio-frequency signals 90 through dielectric cover layer 92. In the example of FIG. 3, surface 45 is illustrated as a curved surface. This is merely illustrative. If desired, surface 45 may be curved.

Dielectric cover layer 92 may have any desired curvature. In one suitable arrangement, dielectric cover layer 92 is curved about (around) a single axis such as axis 106 (e.g., as shown in the cross-sectional side view of FIG. 3). In this arrangement, dielectric cover layer 92 exhibits a cylindrical curvature (e.g., a bent or folded shape with one bend or fold). However, an arrangement in which dielectric cover layer 92 is three-dimensionally curved is described herein as an example. Dielectric cover layer 92 may therefore sometimes be referred to herein as three-dimensionally curved dielectric cover layer 92. Three-dimensionally curved dielectric cover layer 92 may be curved about multiple axes such as at least axis 106 and axis 108. Axes 106 and 108 may both run through the interior of device 10. Axis 108 may be different from axis 106. Axis 108 may extend at a nonparallel angle (e.g., an angle greater than 0 and less than 180 degrees) with respect to axis 106 (e.g., axis 108 may be non-parallel or perpendicular with respect to axis 106). Axes 108 and 106 may intersect at a point within the interior of device 10 or may be non-intersecting.

In other words, three-dimensionally curved dielectric cover layer 92 (e.g., interior surface 94 and/or exterior surface 96) may exhibit a non-zero curvature (e.g., a non-zero radius of curvature) about two or more non-parallel axes extending through the interior of device 10, such as axes 106 and 108. Two or more of the axes may be parallel if desired. The three-dimensional curve is non-cylindrical. Three-dimensionally curved dielectric cover layer 92 may exhibit the same curvature about axis 106 as about axis 108 or may exhibit more or less curvature about axis 106 than about axis 108. As examples, three-dimensionally curved dielectric cover layer 92 may be spherically curved (e.g., interior surface 94 and/or exterior surface 96 may be spherical surfaces), aspherically curved (e.g., interior surface 94 and/or exterior surface 96 may be aspherical curved surfaces), freeform curved (e.g., interior surface 94 and/or exterior surface 96 may be freeform curved surfaces), etc.

In general, it may be desirable to provide a uniform and smooth impedance transition from antenna resonating element 46 through three-dimensionally curved dielectric cover layer 92 and to free space across the entire lateral area of antenna resonating element 46. This may serve to maximize antenna efficiency for antenna 40 by minimizing signal reflections as radio-frequency signals 90 pass through three-dimensionally curved dielectric cover layer 92. However, in arrangements where the dielectric cover layer is three-dimensionally curved, it can be particularly difficult to ensure that there is a uniform and smooth impedance transition across the entire lateral area of antenna resonating element 46. In addition, if care is not taken, mechanical impacts and wear on device 10 over time can introduce non-uniform impedance discontinuities over portions of antenna resonating element 46.

Figure 4:
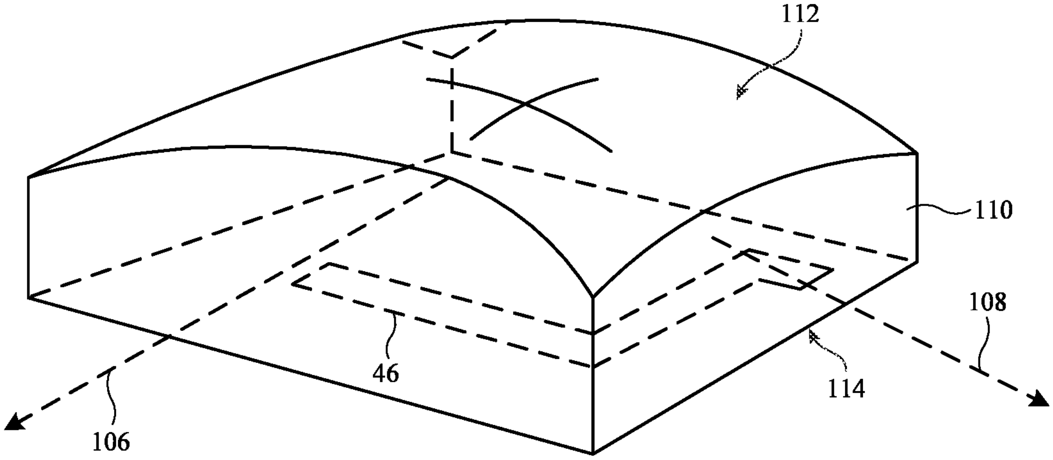
FIG. 4 is a perspective view of an illustrative dielectric adapter for providing a smooth impedance transition between an antenna on a planar substrate and a three-dimensionally curved cover layer in accordance with some embodiments.

If desired, device 10 may include a dielectric adapter for providing a uniform and smooth impedance transition through three-dimensionally curved dielectric cover layer 92 across the entire lateral area of antenna resonating element 46. Antenna resonating element 46 may be pressed against three-dimensionally curved dielectric cover layer 92 through the dielectric adapter. FIG. 4 is a perspective view of an illustrative dielectric adaptor for antenna 40.

As shown in FIG. 4, device 10 may include a dielectric adapter such as dielectric adapter 110. Dielectric adapter 110 (shown in transparency in the example of FIG. 4) may be mounted in device 10 over antenna resonating element 46 (e.g., dielectric adapter 110 may overlap antenna resonating element 46). Dielectric adapter 110 may have a first surface 114 and an opposing second surface 112. Surface 114 may be pressed against antenna resonating element 46. Surface 112 may be pressed against interior surface 94 of three-dimensionally curved dielectric cover layer 92 (FIG. 3). Dielectric adapter 110 may sometimes be referred to herein as dielectric impedance adapter 110, dielectric transformer 110, or dielectric impedance transformer 110.

Surface 112 of dielectric adapter 110 may be a three-dimensionally curved surface. The three-dimensional curvature of surface 112 may be selected to match (conform to) the three-dimensional curvature of three-dimensionally curved dielectric cover layer 92 (FIG. 3) (e.g., surface 112 may extend parallel to interior surface 94 of three-dimensionally curved dielectric cover layer 92 across the entire lateral area of surface 112). For example, as shown in FIG. 4, surface 112 may be curved about axis 106 and may be curved about axis 108. In other words, surface 112 may exhibit a non-zero curvature (e.g., radius of curvature) about two or more non-parallel axes extending through the interior of device 10, such as axes 106 and 108. As examples, surface 112 may be spherically curved (e.g., in arrangements where the dielectric cover layer is spherically curved), aspherically curved (e.g., in arrangements where the dielectric cover layer is aspherically curved), freeform curved (e.g., in arrangements where the dielectric cover layer is freeform curved), etc.

Surface 114 may be pressed flush against an entirety of antenna resonating element 46. This may ensure that there is a smooth impedance transition (e.g., in each of the frequency bands handled by the antenna) between antenna resonating element 46 and dielectric adapter 110. When dielectric adapter 110 is pressed against interior surface 94 of three-dimensionally curved dielectric cover layer 92 (FIG. 3), all of surface 112 may be pressed flush against interior surface 94. This may help to ensure that there is a smooth impedance transition between dielectric adapter 110 and the dielectric cover layer, thereby ensuring that there is a smooth impedance transition from the antenna through the dielectric cover layer and into free space.

In general, surface 114 may extend parallel to the surface on which antenna resonating element 46 is formed. In the example of FIG. 4, surface 114 is a planar surface. This may ensure that surface 114 is pressed flush against an entirety of antenna resonating element 46 in scenarios where antenna resonating element 46 is printed on a planar surface. In scenarios where antenna resonating element 46 is formed on a curved surface, surface 114 may also be curved. The curvature of surface 114 may be selected to match (conform to) the curvature of the surface on which antenna resonating element 46 is formed. This may ensure that surface 114 is pressed flush against an entirety of antenna resonating element 46 in scenarios where antenna resonating element 46 is printed on a curved surface.

Figure 5:
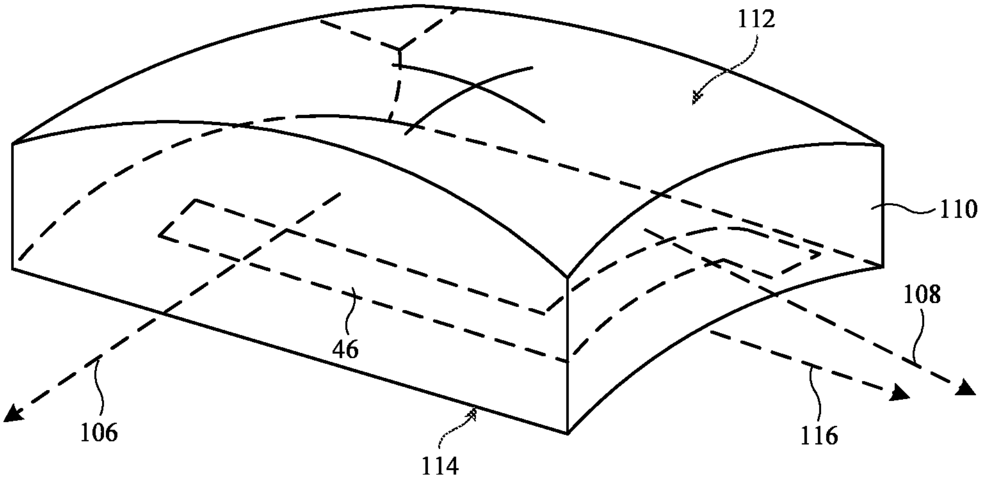
FIG. 5 is a perspective view of an illustrative dielectric adapter for providing a smooth impedance transition between an antenna on a curved substrate and a three-dimensionally curved cover layer in accordance with some embodiments.

FIG. 5 is a perspective view showing how surface 114 may be a curved surface. As shown in FIG. 5, surface 114 may be curved about a single axis such as axis 116 (surface 114 is not three-dimensionally curved in this example). In other words, surface 114 may exhibit a non-zero curvature (e.g., radius of curvature) about axis 116. The curvature may match (conform to) the underlying curvature of the surface on which antenna resonating element 46 is formed. Axis 116 may extend at any desired angle (e.g., parallel to axis 106, parallel to axis 108, non-parallel with respect to axis 106 and/or axis 108, an angle within a plane parallel to the plane that includes axes 106 and 108, an angle within a plane that is non-parallel with respect to the plane that includes axes 106 and 108, etc.). When configured in this way, surface 114 is bent or folded in a single direction, around axis 116 (e.g., with a cylindrical curvature).

Figure 6:
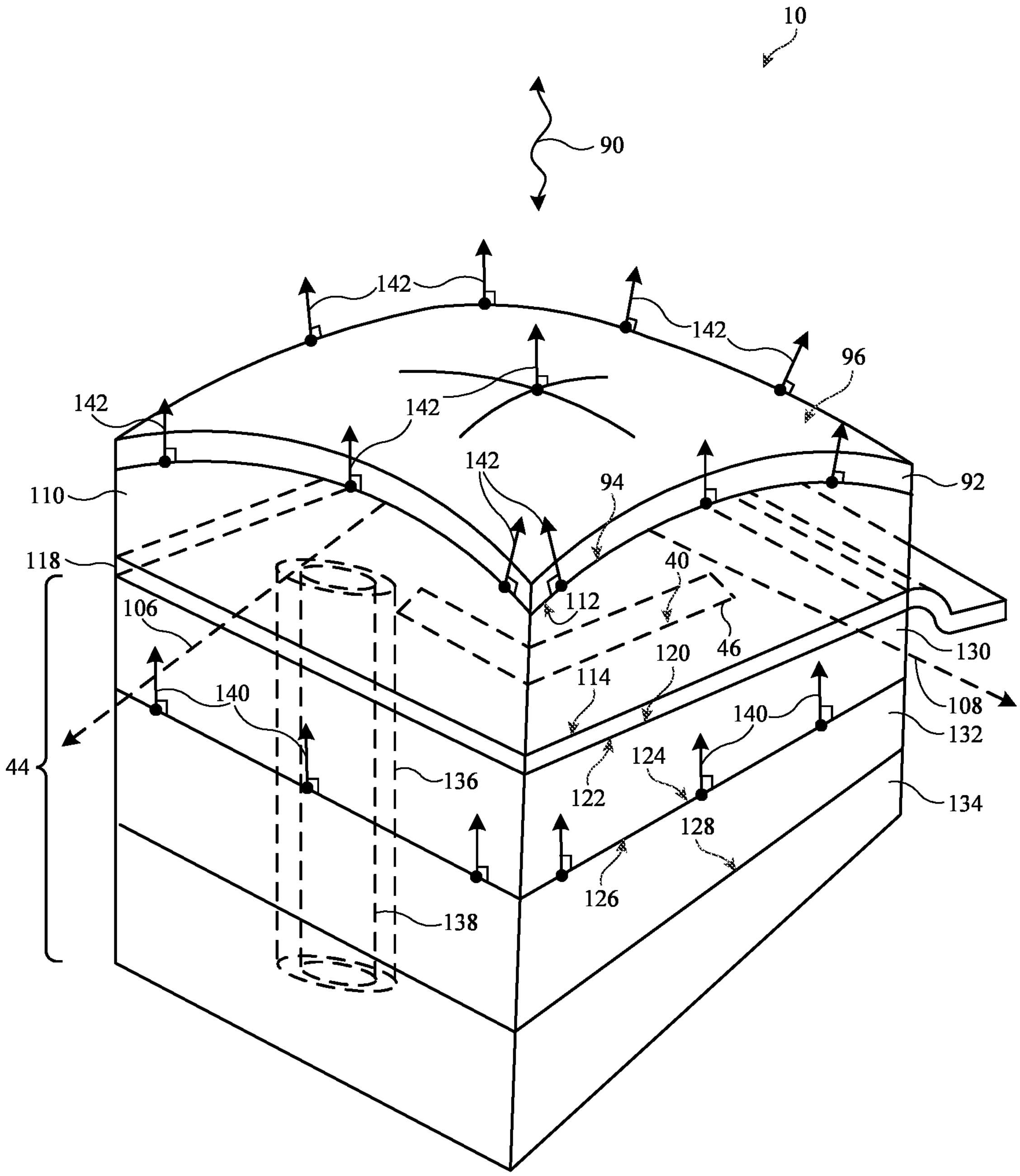
FIG. 6 is a perspective view showing how illustrative biasing structures may press an antenna and a dielectric adapter against a three-dimensionally curved cover layer to provide a smooth impedance transition between the antenna and the three-dimensionally curved cover layer in accordance with some embodiments.

In order to further ensure a reliable smooth impedance transition between antenna resonating element 46 and three-dimensionally curved dielectric cover layer 92, dielectric antenna carrier 44 (FIG. 3) may include biasing structures. The biasing structures may press antenna resonating element 46 and dielectric adapter 110 against the interior surface of three-dimensionally curved dielectric cover layer 92 with a uniform biasing force across the entire area overlapping the antenna. FIG. 6 is a perspective view showing how biasing structures in dielectric antenna carrier 44 may press antenna resonating element 46 and dielectric adapter 110 against three-dimensionally curved dielectric cover layer 92.

As shown in FIG. 6, dielectric antenna carrier 44 may include a first rigid substrate such as substrate 134 and a second rigid substrate such as substrate 130. Substrates 130 and 134 may be formed from plastic, glass, ceramic, or any other desired rigid dielectric materials. Dielectric antenna carrier 44 may also include a compressible foam member such as foam member 132. Foam member 132 may be interposed (e.g., layered) between substrates 130 and 134. For example, foam member 132 may have a first (top) surface 126 that is pressed against (bottom) surface 124 of substrate 130. Foam member 132 may also have a second (bottom) surface 128 that is pressed against substrate 134.

Antenna resonating element 46 of antenna 40 may be formed from conductive traces patterned onto a substrate such as flexible printed circuit 118. Antenna resonating element 46 may be patterned on top surface 114 of flexible printed circuit 118. Flexible printed circuit 118 may be layered over (top) surface 122 of substrate 130 (e.g., bottom surface 120 of flexible printed circuit 118 may be coupled to surface 122 of substrate 130). In another suitable arrangement, flexible printed circuit 118 may be omitted and antenna resonating element 46 may be patterned directly onto substrate 130 (e.g., using an LDS process). Surface 122 of substrate 130 may form surface 45 of FIGS. 2 and 3, for example.

Dielectric adapter 110 may be mounted to surface 114 of flexible printed circuit 118 (or surface 122 of substrate 130 in scenarios where flexible printed circuit 118 is omitted and antenna resonating element 46 is patterned directly onto surface 122 of substrate 130). In other words, surface 114 of dielectric adapter 110 may be in coupled to (e.g., in direct contact with) antenna resonating element 46 and surface 114 of flexible printed circuit 118 (or surface 122 of substrate 130 in scenarios where flexible printed circuit 118 is omitted). Surface 112 of dielectric adapter 110 may be pressed against and in direct contact with interior surface 94 of three-dimensionally curved dielectric cover layer 92.

Foam member 132 may be compressed between substrates 130 and 134 such that foam member 132 exerts an upwards biasing (compression) force against substrate 130, as shown by arrows 140. This biasing force may be uniform across the lateral area of antenna resonating element 46, for example. The biasing force may transfer to three-dimensionally curved dielectric cover layer 92 through substrate 130, flexible printed circuit 118, and dielectric adapter 110. In this way, dielectric antenna carrier 44 may include biasing structures for antenna 40 (e.g., substrates 130 and 134 and foam member 132 may collectively form biasing structures for antenna 40). Dielectric antenna carrier 44 may therefore sometimes be referred to herein as biasing structures 44.

Because the three-dimensional curvature of surface 112 matches (conforms to) the three-dimensional curvature of interior surface 94, the biasing force produced by foam member 132 may cause dielectric adapter 110 to transfer the biasing force to three-dimensionally curved dielectric cover layer 92 in a direction normal (perpendicular) to interior surface 94 at all points across the lateral area of surface 112, as shown by arrows 142. Ensuring that the biasing force is transferred in a direction normal to the lateral area of three-dimensionally curved dielectric cover layer 92 may ensure that antenna resonating element 46 remains separated from three-dimensionally curved dielectric cover layer 92 by the same distance over time, regardless of mechanical stress or impact events that occur on device 10. This may in turn ensure that there is a smooth and uniform impedance transition over time between all of antenna resonating element 46 and free space through three-dimensionally curved dielectric cover layer 92 and dielectric adapter 110, thereby minimizing impedance discontinuities and signal reflections and maximizing the antenna efficiency for device 10 over time.

In the example of FIG. 6, surface 114 of dielectric adapter 110 is planar. This is merely illustrative. In another suitable arrangement, surface 114 may be curved (e.g., about a single axis such as axis 116 as shown in FIG. 5). In these scenarios, surface 122 of substrate 130 may have a curvature that matches (conforms to) the curvature of surface 114. Curving surfaces 114 and 122 about a single axis (e.g., axis 116 of FIG. 5) may allow flexible printed circuit 118 to be curved around the same axis. This is merely illustrative and, in another suitable arrangement, surfaces 114 and 122 may be three-dimensionally curved. In these scenarios, flexible printed circuit 118 may be omitted and antenna resonating element 46 may be patterned directly onto surface 122 of substrate 130 (e.g., because flexible printed circuit 118 may be unable to accommodate such three-dimensional curvature). If desired, foam member 132, substrate 130, and/or substrate 134 may be partially or completely replaced by springs, pins, and/or any other desired biasing structures that exert the biasing force associated with arrows 140 against antenna 40 and dielectric adapter 110.

If desired, the materials used to form dielectric adapter 110 may be selected so that dielectric adapter 110 exhibits a desired dielectric constant. The dielectric constant may be selected to help form a smooth impedance transition between antenna 40 and free space through three-dimensionally curved dielectric cover layer 92. For example, the dielectric constant of dielectric adapter 110 may be selected to be between the dielectric constant of three-dimensionally curved dielectric cover layer 92 and the dielectric constant of flexible printed circuit 118 and/or substrate 130. If desired, dielectric adapter 110 may have a gradient dielectric constant from surface 114 to surface 112 (e.g., in scenarios where dielectric adapter 110 is formed from plastic).

If desired, one or more adhesive layers may be used to couple (adhere or affix) substrate 134 to foam member 132, to couple foam member 132 to substrate 130, to couple substrate 130 to flexible printed circuit 118, to couple flexible printed circuit 118 to dielectric adapter 110, to couple substrate 130 to dielectric adapter 110, and/or to couple dielectric adapter 110 to three-dimensionally curved dielectric cover layer 92. In one suitable arrangement that is sometimes described herein as an example, a first adhesive layer is interposed between foam member 132 and substrate 130 for adhering foam member 132 to substrate 130 and a second adhesive layer is interposed between substrate 130 and flexible printed circuit 118 for adhering flexible printed circuit 118 to substrate 130 (e.g., without adhesive layers between flexible printed circuit 118 and dielectric adapter 110 or between dielectric adapter 110 and three-dimensionally curved dielectric cover layer 92).

If desired, dielectric antenna carrier 44 may include one or more alignment holes 136. Each alignment hole 136 may extend through substrate 130, foam member 132, and substrate 134. An alignment pin such as alignment pin 138 may be inserted into each alignment hole 136. The alignment pins may help to hold dielectric antenna carrier 44 together and in place during assembly and/or during the operation of device 10. Substrate 134 may be mounted to or replaced by another substrate in device 10, a printed circuit board in device 10 (e.g., a main logic board, etc.), a portion of the housing for device 10, a conductive or dielectric support plate or frame for device 10, and/or any other desired structures in device 10.

The foregoing is merely illustrative and various modifications can be made to the described embodiments. The foregoing embodiments may be implemented individually or in any combination.

What is claimed is:

1. An electronic device comprising:

a cover layer having a first three-dimensionally curved surface;

a first dielectric having a second three-dimensionally curved surface;

an antenna comprising an antenna resonating element and an antenna ground, wherein the antenna resonating element is configured to radiate through the cover layer and the first dielectric, the antenna resonating element comprising first, second, and third arms configured to radiate in different first, second, and third frequency bands, respectively;

a second dielectric having a first surface oriented in a first direction and a second surface oriented in a second direction different than the first direction, wherein the antenna resonating element is disposed on the first surface of the second dielectric and at least some of the antenna ground is disposed on the second surface of the second dielectric;

a third dielectric configured to press the second dielectric against the first dielectric; and an alignment hole that extends through the third dielectric.

2. The electronic device of claim 1, wherein the second three-dimensionally curved surface extends parallel to the first three-dimensionally curved surface.

3. The electronic device of claim 1, wherein the cover layer comprises glass and the first dielectric comprises plastic.

4. The electronic device of claim 1, wherein the first three-dimensionally curved surface is aspherically curved.

5. The electronic device of claim 1, wherein the antenna ground is shorted to a system ground using a conductive fastening structure.

6. The electronic device of claim 1, wherein the first arm forms a loop-shaped path and has first and second portions, the second arm has third and fourth portions, the third arm has a fifth portion, the third portion is parallel to the first portion, and the fifth portion is parallel to the fourth and second portions.

7. An electronic device comprising:

a housing comprising a three-dimensionally curved cover layer;

a first dielectric, having a first surface facing the three-dimensionally curved cover layer and a second surface opposite the first surface;

an antenna configured to radiate through the three-dimensionally curved cover layer and the first dielectric;

a substrate, wherein the antenna is disposed on a portion of a surface of the substrate;

a biasing structure, wherein the substrate is adhered to the biasing structure and the biasing structure is mounted to a portion of the housing; and an alignment hole that extends through the substrate and the biasing structure.

8. The electronic device of claim 7, wherein the first surface is three-dimensionally curved.

9. The electronic device of claim 8, wherein the second surface is planar.

10. The electronic device of claim 8, wherein the second surface is curved about a single axis.

11. The electronic device of claim 8, wherein the second surface is three-dimensionally curved.

12. The electronic device of claim 8, wherein the first surface extends parallel to the three-dimensionally curved cover layer.

13. The electronic device of claim 7, wherein the portion of the surface of the substrate is a curved portion.

14. The electronic device of claim 13, wherein the substrate comprises a flexible printed circuit and the antenna comprises a conductive trace on the flexible printed circuit.

15. The electronic device of claim 7, wherein the three-dimensionally curved cover layer comprises glass.

16. The electronic device of claim 7, wherein the biasing structure exerts a uniform biasing force across an entire lateral area of the antenna.

17. An electronic device comprising:

a glass cover layer that has a first non-zero curvature about a first axis and a second non-zero curvature about a second axis oriented non-parallel with respect to the first axis;

a dielectric layer pressed against the glass cover layer;

an antenna comprising an antenna resonating element, wherein the antenna is pressed against the dielectric layer and is configured to radiate through the glass cover layer and the dielectric layer;

a biasing structure, wherein the biasing structure exerts a biasing force against the antenna, a first interface between the glass cover layer and the dielectric layer is free of adhesive, and a second interface between the dielectric layer and the antenna resonating element is free of adhesive; and an alignment hole that extends through the biasing structure.

18. The electronic device of claim 17, wherein the antenna comprises a conductive trace on a flexible printed circuit.

19. The electronic device of claim 17, wherein the glass cover layer has a surface, the surface has the first non-zero curvature about the first axis and the second non-zero curvature about the second axis, the second non-zero curvature is different than the first non-zero curvature, the antenna resonating element is formed on a substrate, and the first and second axes are parallel to a bottom surface of the substrate.

* * * * *